(No Model.)
E. V. PEIRSON.
DEVICE FOR INFLATING PNEUMATIC TIRES.
No. 585,924. Patented July 6, 1897.
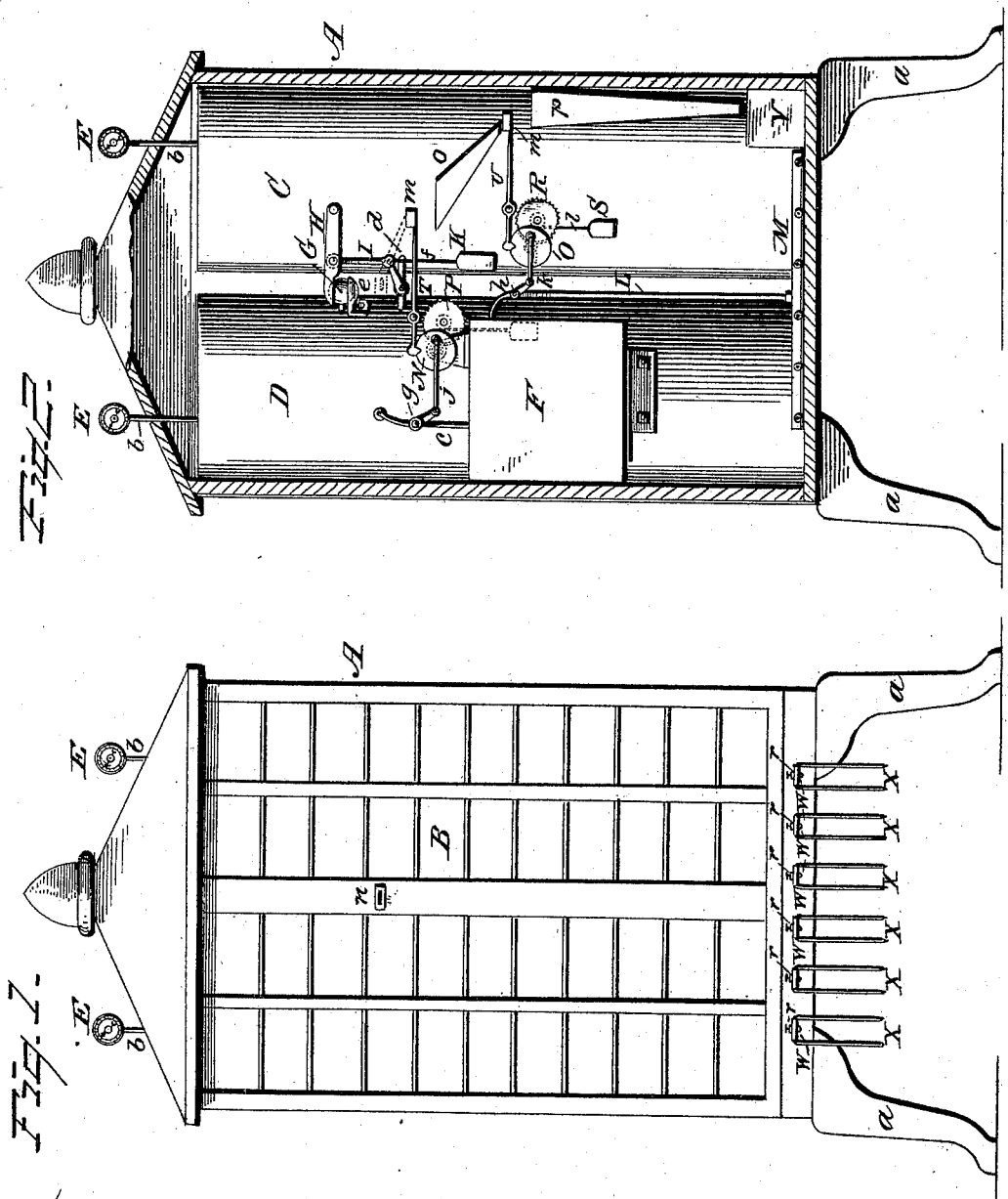
Witnesses
C. J. Williamson
Wm. Browning
Inventor
Ernest V. Peirson,
per
Chas. H. Fowler,
Attorney.

UNITED STATES PATENT OFFICE.

ERNEST V. PEIRSON, OF NEWARK, NEW YORK.

DEVICE FOR INFLATING PNEUMATIC TIRES.

SPECIFICATION forming part of Letters Patent No. 585,924, dated July 6, 1897.

Application filed January 7, 1896. Renewed June 8, 1897. Serial No. 639,909. (No model.)

*To all whom it may concern:*

Be it known that I, ERNEST V. PEIRSON, a citizen of the United States, residing at Newark, in the county of Wayne and State of New York, have invented certain new and useful Improvements in Devices or Apparatus for Inflating Pneumatic Tires; and I do hereby declare that the following is a full, clear, and exact description of the same, reference being had to the annexed drawings, making a part of this specification, and to the letters of reference marked thereon.

The present invention has relation to the means for supplying air to the pneumatic tires of bicycles or other wheeled vehicles to properly inflate them; and the object thereof is to provide a stationary device containing a supply of air stored in suitable tanks, means for pumping the air into the tanks, and a releasing mechanism operated by dropping a coin in a slot, whereby the air is conducted through tubes to the pneumatic tire for the purpose of inflating it.

The invention consists of a device constructed substantially as shown in the drawings and hereinafter described and claimed.

Figure 1 is a front elevation of my improved device with the front portion in position and the several discharge-tubes connected thereto for attachment to the pneumatic tires. Fig. 2 is a similar view with the front portion of the casing removed to show the interior construction.

In the accompanying drawings, A represents a suitable casing which may be of any desirable size and shape and, if preferred, provided with a front B, adapted to receive and hold advertising-cards or utilized in any other manner for advertising purposes. The casing A is preferably supported on feet $a$ to raise the casing above the floor to the required height for use. Located in the casing A are two upright tanks C D, which are provided at their upper end with vertical tubes $b$, communicating with the interior thereof and extending up through the roof of the casing and having gages E, which indicate the pressure in the tanks. The tank D is provided with a supplemental tank or reservoir F, which communicates with the interior thereof through a pipe $c$, connecting the two tanks and enabling the air from tank D to pass into the tank or reservoir F for use in inflating the tire of the wheel, as will be hereinafter described.

The tank C, I shall term the "storage-tank" and the tank D the "receiving-tank," and thus communicate with each other through a pipe $d$, so that the air from the storage-tank will pass into the receiving-tank and thence into the supplemental tank or reservoir F. The storage-tank is supplied with air by any suitable and well-known air-pumping device or apparatus found best adapted to the purpose, and an automatic cut-off is connected with the tanks C D, so that when the tank is full of air and the required pressure attained communication between the two tanks are closed. Any suitable cut-off mechanism may be employed, and in the present instance I have shown one of many forms that may be used to advantage, and consists of an elastic hollow ball G, supported upon a bracket $e$, secured to the tank D. This bracket has a concave seat to correspond with the convexity of the ball, the interior of said ball communicating with the interior of the tank D by a short nipple or pipe or by any other means found preferable. A compressing-arm H is pivoted at one end to the tank C, its free end having a concave bearing to conform to the convexity of the ball, over which it is located, as shown. A suitable faucet connects with the pipe $d$ and is operated by a crank-lever I of any suitable construction, said lever being pivotally connected to the compressing-arm H. A weight K is connected to the crank-lever I by means of a chain or cord $f$ and operates the arm H to compress the ball G when the pressure of air therein is not sufficient to overcome the weight K.

When the tank D is sufficiently supplied with air from the tank C, the ball G will be inflated and the pressure therein sufficient to hold the free end of the arm H up against the gravity of the weight K, as shown in Fig. 2 of the drawings, in which position the valve in the pipe $d$ is closed to shut off the passage of air from the storage-tank C to the receiving-tank D.

When the air in the tank D becomes below a certain pressure from the transfer of the air therein to the supplemental tank or reservoir F, the pressure from the interior of the ball G will be correspondingly removed and the weight K will pull down the arm H upon the ball and compress it, and by the crank-lever I connecting with the weight the faucet in the pipe $d$ will be opened to allow air to pass from tank C to the tank D.

The supply of air to the supplemental tank or reservoir F through the pipe $c$ is controlled by an automatically-operating valve $g$, and the discharge of air from said tank or reservoir through the pipe L to the distributing-pipe M is controlled by an automatically-operating valve $h$.

The several valves or faucets employed in my apparatus or device may be of any of the usual forms and of any well-known construction, and the means for automatically operating them, or whereby the valves may be closed or opened, may be variously modified or changed as would be found best adapted to the purpose. One means which may be employed with success consists in the notched disks N O, to which the crank-arms $j\ k$ are eccentrically connected. These notched disks N O have suitable pinions with which engage, respectively, toothed wheels P R, which are provided with weights S, connected thereto by chains or cords $l$, the weight and cord of the toothed wheel P being shown in dotted lines only. A pawl-lever T, which is pivoted to the tank D or other stationary object, engages the notch of the disk N, and a similar pawl-lever U engages the notch of the disk O, which lever is pivoted in a similar manner to the lever T. The long arm of the levers T U have baskets $m$ at their ends or other suitable receptacles to receive the coin as it is deposited in the slot or opening $n$ in the front of the casing A, said coin in its descent passing into the basket of the pawl-lever T, thence down chute $o$ into basket on the end of the pawl-lever U, and from said basket into chute $p$ to the box V.

The distributing-pipe M is provided with couplings W of suitable form and construction, each coupling having a faucet $r$ connected therewith and a pair of rubber tubes, as shown at X. These tubes are to be provided with coupling devices or nipples to adapt them to each make of wheel, whereby they may be secured to the tires thereof for the purpose of transferring the air from the tank or reservoir F, through the pipes L and M and through the tubes X, to the pneumatic tire for the purpose of inflating it when the air becomes exhausted.

The distributing-pipe M and its connections, as well as the tubes X, may be variously changed or modified, as circumstances would require, and the nipples or coupling devices on the tubes may be of such construction as are used in the various makes of pneumatic tires and therefore are not shown or described.

In the operation of the device or apparatus the rubber tubes are first coupled to the pneumatic tires and a nickel or other coin of the denomination and weight that is necessary is deposited through the slot or opening $n$ in the front of the casing A. The weight of the coin, after passing in the basket at the end of the lever T, will depress that end of the lever to which the basket is connected and raise the pawl at the opposite end of the lever out of the notch of the disk N, thus releasing the disk. As the disk N is released by the pawl on the lever T the weight S, which is connected with the toothed wheel P, will descend and turn said wheel and through its pinion connection with the disk will cause said disk to slowly turn a complete revolution, which gives sufficient time to supply to the supplemental tank or reservoir F a given amount of air, sufficient to inflate the pneumatic tires of a bicycle or other like vehicle. As the disk N revolves the valve $g$ will be opened and closed successively, the complete revolution of the disk bringing the notch thereon in position to again engage with pawl on the lever T, the crank-arm connection between the disk and valve operating the valve to open and close it, during which time a sufficient amount of air is admitted to the supplemental tank or reservoir F to properly inflate the pneumatic tires of a bicycle or other vehicle.

The above-described operation of the mechanism necessary to supply the supplemental tank or reservoir with a given amount of air having been performed, the next step in the operation is to take the air that has been allowed to pass into the supplemental tank or reservoir and conduct it to the pneumatic tire of the bicycle for the purpose of inflating it. The coin as it passes from the basket at the end of the lever T drops into the chute $o$ and thence into the basket at the end of the lever U. The weight of the coin will depress the long arm of the lever U and raise the pawl at the opposite end thereof to release the disk $o$, which is connected with the valve $h$ through the crank-arm $k$. As the disk is thus released the toothed wheel R, through its pinion connection with said disk, will cause the disk to make a complete revolution, and in so doing open and close the valve $h$ successively through its crank-arm connections. Previous to the valve being closed a sufficient amount of air passes from the tank or reservoir F down the pipe L into the distributing-pipe M, and thence through the rubber tubes X to the pneumatic tire of the bicycle or other vehicle, to which said tubes have been previously connected the faucet $r$ in the coupling W for the passage of the air through the tubes. The coin as it leaves the basket on the end of the lever U passes down the chute $p$ into the money-box V. The weight S, connecting with the toothed wheel R, operates said wheel in the same manner as the weight connecting the toothed wheel P, the several operating parts assuming the position indicated in Fig. 2 of the drawings when the valves $g\ h$ are closed.

It is desirable that there should be a certain amount of pressure in the supplemental tank or reservoir F to properly inflate the tires of a bicycle or other vehicle during the time the valves are opened and closed, and the chains or cords of the weights S are of sufficient length to admit the operation of the parts many times without being rewound on the shaft or drum of the wheels.

The valves and the means for operating them may be variously modified or changed in detail without departing from the principle of my invention, and in place of the weights suitable springs may be substituted and suitable gearing connected therewith, and any such changes as would come within ordinary mechanical judgment or skill may be resorted to without effecting the essential features of the invention.

Having now fully described my invention, what I claim as new, and desire to secure by Letters Patent, is—

1. A device or apparatus for inflating bicycle or other pneumatic tires, consisting of a suitable tank for containing the air, a supplemental tank communicating therewith, a valve mechanism for automatically controlling the supply of air to the supplemental tank, tubes adapted for attachment to the pneumatic tire which communicate with the supplemental tank, and a coin-controlled valve-operating mechanism for controlling the discharge of air from the supplemental tank to the tubes, substantially as and for the purpose set forth.

2. A device or apparatus for inflating bicycle or other pneumatic tires, consisting of a storage-tank for the air, a receiving-tank communicating therewith, a supplemental tank or reservoir communicating with the receiving-tank, an automatically-operating valve or cut-off for controlling the supply of air from the storage-tank to the receiving-tank, suitable tubes adapted for attachment to the pneumatic tire and communicating with the supplemental tank, and a coin-controlled valve-operating mechanism which controls the supply of air to the supplemental tank and from the supplemental tank to the discharge-tubes, substantially as and for the purpose specified.

3. A device or apparatus for inflating bicycle or other pneumatic tires, consisting of a suitable casing, a tank for containing the air, a supplemental tank or reservoir, means for forming a communication between the tanks, a valve-operating mechanism for automatically controlling the passage of air from one tank to the other, a distributing-pipe with means for forming a communication with the pneumatic tire to be inflated, a connection between the distributing-pipe and the supplemental tank or reservoir, a valve-operating mechanism controlling the supply of air through the distributing-pipe, the valve mechanism being operated by the descent of a coin deposited in the device or apparatus, substantially as and for the purpose specified.

4. A device or apparatus for inflating bicycle or other pneumatic tires, consisting of a suitable casing, a storage-tank, a receiving-tank communicating therewith, a supplemental tank or reservoir communicating with the receiving-tank, a distributing-pipe connecting with said pipe, a coin-controlled operating mechanism for opening and closing the communication between the receiving-tank and the supplemental tank or reservoir, a coin-controlled operating mechanism for opening and closing the passage for the air from the supplemental tank or reservoir to the distributing-pipe, and an automatic valve-operating mechanism for controlling the supply of air from the storage-tank to the receiving-tank, substantially as and for the purpose specified.

5. A device or apparatus for inflating bicycle or other pneumatic tires, consisting of a suitable casing, a storage-tank for the air, a receiving-tank communicating therewith, an automatic valve-operating mechanism for controlling the communication between the tanks, which mechanism consists of a suitable pivoted pressure-arm and connections between it and the valve, and a hollow elastic ball communicating with the interior of the receiving-tank, and a weight for operating the arm to compress the ball, a supplemental tank or reservoir communicating with the receiving-tank, a coin-controlled valve-operating mechanism to control the supply and discharge of air to and from the supplemental tank or reservoir, substantially as and for the purpose specified.

6. A device or apparatus for inflating bicycle or other pneumatic tires, consisting of a suitable casing, a receiving-tank for containing air, a supplemental tank or reservoir communicating therewith, a coin-controlled operating-valve mechanism for controlling the supply and discharge of air to and from the tank or reservoir, said mechanism consisting of a rotary notched disk, a crank-arm connection between the disk and the valve, a toothed wheel connecting with a pinion on the disk, a weight for operating the wheel, a pivoted lever provided with a pawl at one end adapted to engage with the notch of the disk and having at its opposite end a basket or other suitable receptacle for receiving the coin, substantially as and for the purpose set forth.

7. A device or apparatus for inflating bicycle or other pneumatic tires, consisting of a suitable casing, a storage-tank for the air, a receiving-tank communicating therewith, an automatically-operating device for controlling the supply of air from the storage-tank to the receiving-tank, a supplemental tank or reservoir communicating with the receiving-tank, a coin-controlled operating-valve mechanism for controlling the supply of air from the receiving-tank to the supplemental tank or reservoir, a distributing-pipe provided with faucets and rubber tubes, a coin-controlled operating-valve mechanism for controlling the passage of air from the tank or reservoir to the distributing-pipe, substantially as and for the purpose described.

8. A device or apparatus for inflating bicycle or other pneumatic tires, consisting of a suitable casing, a storage-tank and a receiving-tank for the air, said tanks communicating with each other and provided with suitable pressure-gages, an automatic device for controlling the supply of air from the storage-tank to the receiving-tank, a supplemental tank or reservoir communicating with the receiving-tank, a coin-controlled valve-operating mechanism for controlling the supply of air from the receiving-tank to the supplemental tank or reservoir, a distributing-pipe provided with faucets and rubber tubes for attachment to the pneumatic tire, a tubular connection between the distributing-pipe and the supplemental tank or reservoir, a coin-controlled valve-operating mechanism for controlling the discharge of air from the supplemental tank or reservoir, suitable chutes to receive the descending coin, and a receptacle in which the coin is finally deposited, substantially as and for the purpose set forth.

In testimony that I claim the above I have hereunto subscribed my name in the presence of two witnesses.

ERNEST V. PEIRSON.

Witnesses:
 J. P. BALLOU,
 S. RAY PEIRSON.